Figure 1:
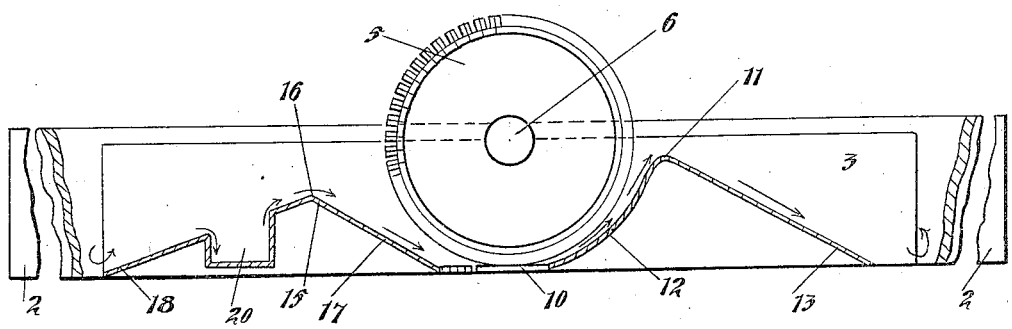

H. J. MEADER.
BEATER.
APPLICATION FILED APR. 10, 1912.

1,134,344.

Patented Apr. 6, 1915.

WITNESSES:
L. C. Snyder.
E. T. DeGiorgi

INVENTOR
Henry J. Meader
BY
Henry M. Love
ATTORNEY

UNITED STATES PATENT OFFICE.

HENRY J. MEADER, OF UTICA, NEW YORK.

BEATER.

1,134,344.  Specification of Letters Patent.  Patented Apr. 6, 1915.

Application filed April 10, 1912. Serial No. 689,747.

*To all whom it may concern:*

Be it known that I, HENRY J. MEADER, a citizen of the United States, residing at Utica, in the county of Oneida and State of New York, have invented certain new and useful Improvements in Beaters, of which the following is a specification, reference being had therein to the accompanying drawing.

My invention relates to an improved beater, and I declare that the following is a full, clear, concise and exact description thereof, sufficient to enable one skilled in the art to make and use the same, reference being had to the accompanying drawings in which like reference characters refer to like parts throughout.

The subject of the invention is a machine constructed to macerate and reduce to liquid form material suitable for making paper, water being supplied to the mass during the process of reduction. In such machines a beater-roll is provided which is revolved, the lower face being close to the bed-plate. An oblong tank is provided which has a partition on its central longitudinal line but which does not extend to either end of the tank. The tank is thus a course or run for the circulation of the material. A beater-roll is revolubly supported between one interior wall of the tank and the oppositely-facing wall of the partition. A bedplate is set at the bottom of the tank below the beater-roll and close enough to it to effect reduction of the paper material as it passes between the two. The revolution of the beater-roll causes the circulation of the material in the tank. A back-fall is built in the bottom of the tank on the discharge side of the beater-roll. It consists of a structure rising above the bottom of the tank and extending transverse the tank. Its top is below the surface of the circulating mass. One face is curved substantially as the circumference of the roll from which it is somewhat spaced. The other face is a decline from the top of the back-fall to the bottom of the tank. Without the use of the back-fall the circulation of the material could be caused only by the pushing effect of the revolving beater-roll, on the one side, and its drawing effect on the other. By using a back-fall the lifting efficiency of the revolving roll assists in raising the material to the top of the fall whence the force of gravity aids the circulation as the material passes down the decline. Hence the force of gravity becomes a large factor in causing ready circulation while little, if any, more work is put upon the beater-roll which necessarily, in any case, and by its mere revolution, does some work in lifting the material. The curved face of the fall confines the material within the field of such work. The fall also has a large effect in causing thorough mixing of the mass.

My invention contemplates the use of means on the opposite side of the beater-roll to make the feed of material, both when furnished to the machine and throughout the operation more rapid and easy, to reduce the clogging of material, to quicken the circulation and to increase the mixing of the mass.

Figure 2:
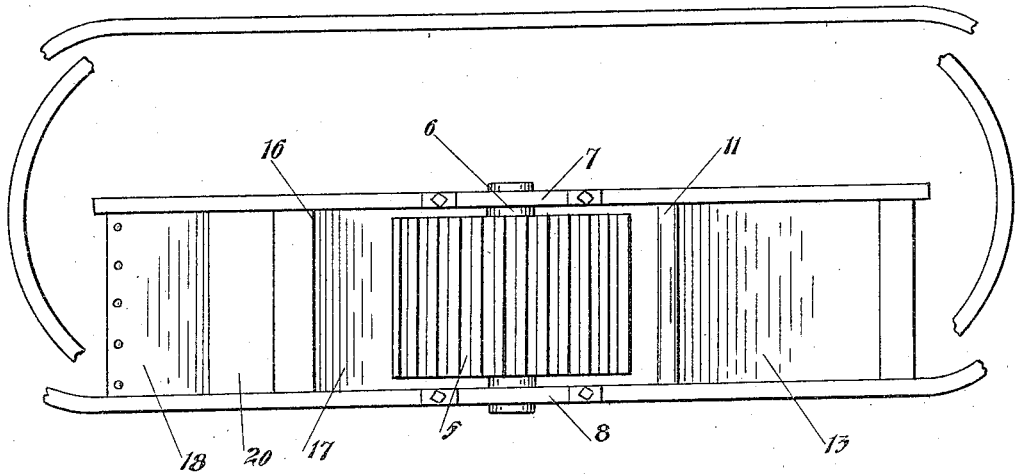

In the drawings Figure 1 is a side view of a beater with one of its sides broken out to give a view of the beater roll, the back-fall and my improved added construction. Fig. 2 is a top view of part of the beater.

Referring to the drawings in detail, 1 represents the bottom of the tank, 2, 2 its side-walls and 3 the partition. 5 is the beater-roll mounted on shaft 6, suitably supported as on the partition and one of the side-walls, as in housings 7 and 8. Power is, of course, applied to revolve the roller, but need not be shown or described.

10 is the bed-plate.

The back-fall is shown at 11, having the curved face 12 and the sloping face 13.

At 15 is shown a construction built up from the bottom of the tank, integral with the tank or secured therein and which extends across that part of the tank in which the beater-roll is placed. Its top or ridge 16 is shown as somewhat lower than the top of the back-fall but is a much greater distance from the roll. From point 16 one surface 17, which is plane as here shown, declines to a point on the bottom below the roll and adjacent the bed-plate. The other surface 18, which is shown as plane, declines at a less steep grade to a point on the bottom. The plain sloping part 17 of the front-fall or feed-fall descends from the top or ridge 16, which is at a considerable distance from the beater roll, to a point beneath the beater roll at the bottom of the tank, the lower end of said sloping part being at a considerable distance from the bed plate 10, thus leaving a level space at the bottom of the tank, between said lower end of said sloping part and said bed plate, thereby providing a wide mouth between the beater roll and feed-fall for the entrance of the material to be reduced. As I have said, the construction may be built in the construction of the tank or it may be put in a tank, without rebuilding or altering the same, and be secured in position by any suitable means.

The surface 18 is broken by a trough 20, transverse the tank and the line of flow, which serves as a trap for foreign matter, such as nails or metal scraps, which might do injury if not separated.

One feature of my invention is the placing of the construction shown, and which may be termed a feed-fall, with an apex or ridge, shown as angular, in front of the beater-roll and whose height is substantially one-half the radius of the roll. Heavier material which has naturally settled in the mixture is raised toward the top by passing up the easy incline 18. The material which presses down the decline of the back-fall discharges against that ahead of it which lies in the bottom of the tank and the constant pressure on the portion at the bottom of the tank presses the material up the incline 18. Another feature is that as the descent from the top of the feed-fall to the roll is more abrupt, the movement of the material is quickened and the heavier and unground portions are forced directly between the roll and the bed-plate. This quickened movement of the material also lessens the tendency to clog. Such movement is not confined to the heavier portions but the entire mass which passes down the face 17 is affected by the force of gravity, because it is all crowded within the space between the top of the fall and the line which marks the surface of the mass above the top of the fall and is suddenly released into a larger space with a downward sloping bottom as soon as it has passed the top of the fall. A particular feature, however, is that the top of the fall is a considerable distance from the beater-roll. In furnishing the beater the material is thrown into the tank a little in front of the feed-fall. Passing over the crest of the fall it is precipitated, partly by reason of its body and weight immediately and directly between the roller and the bed-plate. The rapid movement crowds such masses through the grinding mechanisms and prevents the clogging that might result if such pressure were not used. In machines which are not supplied with my device almost constant use of long paddles is necessary to push such material against the roll. This requires a great deal of time and help and I have found by actual use of my device on several machines that the time required to furnish a beater is reduced to less than a third and the help reduced in about the same proportion. Furthermore, by the quicker movement of the material the same result of the grinding is accomplished in a less time so that I have more than trebled the production of each machine by use of my improvement.

I am aware that in machines constructed for some such general kinds of work a curved plate has been put adjacent the roller and in front of it, much as the curved surface of the back-fall. But such devices are ineffective for the purposes I have named. A distinguishing feature of my device is that the slope to the roll starts from a point at some distance. This provides ample opening for bulky and united masses of material especially to enter the space between the fall and the beater, and once in that space they are forced to the point where the face of the fall and the surface of the roller converge. On the other hand, in such constructions as I have referred to such a result is impossible.

Having described my invention, what I claim as new and desire to secure by Letters Patent, is:

In a pulp beater, the combination with a tank, a beater roll and a bed plate coöperating with said beater roll, of a front-fall or feed-fall having a plain sloping part which descends from a top or ridge, considerably removed from said beater roll, to a point beneath the beater roll at the bottom of the tank, the lower end of said sloping part being at a considerable distance from said bed plate, leaving a level space, at the bottom of the tank, between the said lower end of said sloping part and said bed plate; thereby providing a wide mouth between the said beater roll and the said feed-fall for the entrance of the material to be reduced.

In testimony whereof I hereunto affix my signature in the presence of two witnesses.

HENRY J. MEADER.

Witnesses:
HENRY M. LOVE,
H. N. BURRILL.